(12) United States Patent
Ramachandran et al.

(10) Patent No.: US 9,417,381 B2
(45) Date of Patent: Aug. 16, 2016

(54) OPTICAL FIBER SYSTEMS FOR DELIVERING SHORT HIGH POWER PULSES

(75) Inventors: Siddharth Ramachandran, Hoboken, NJ (US); Stephan Wielandy, Hillsborough, NJ (US)

(73) Assignee: OFS FITEL, LLC, Norcross, GA (US)

( * ) Notice: Subject to any disclaimer, the term of this patent is extended or adjusted under 35 U.S.C. 154(b) by 1188 days.

(21) Appl. No.: 12/459,448

(22) Filed: Jul. 1, 2009

(65) Prior Publication Data

US 2009/0274417 A1 Nov. 5, 2009

Related U.S. Application Data

(63) Continuation of application No. 11/105,850, filed on Apr. 14, 2005, now abandoned.

(51) Int. Cl.
*G02B 6/02* (2006.01)
*G02B 6/036* (2006.01)
*H04B 10/25* (2013.01)
*H04B 10/2507* (2013.01)
*H04B 10/2525* (2013.01)

(52) U.S. Cl.
CPC ........ *G02B 6/02023* (2013.01); *G02B 6/02214* (2013.01); *G02B 6/03644* (2013.01); *H04B 10/25* (2013.01); *H04B 10/2507* (2013.01); *H04B 10/2525* (2013.01)

(58) Field of Classification Search
None
See application file for complete search history.

(56) References Cited

U.S. PATENT DOCUMENTS

| | | | | |
|---|---|---|---|---|
| 4,360,249 | A * | 11/1982 | Slemon | 385/51 |
| 6,249,630 | B1 * | 6/2001 | Stock et al. | 385/123 |
| 2003/0185531 | A1 * | 10/2003 | Lysiansky et al. | 385/127 |
| 2004/0042714 | A1 * | 3/2004 | Ramachandran | 385/28 |
| 2006/0045807 | A1 * | 3/2006 | Zhang et al. | 422/82.05 |

* cited by examiner

*Primary Examiner* — Darren E Wolf
(74) *Attorney, Agent, or Firm* — Law Offices of Leo Zucker

(57) ABSTRACT

Described is an optical fiber system for delivering ultrashort pulses with minimal distortions due to nonlinearity. The system is based on delivering the optical pulses in a higher order mode (HOM) of a few-moded fiber. The fiber is designed so that the dispersion for the HOM is very large. This results in a dispersion length $L_D$ for the delivery fiber that is exceptionally small, preferably less than the non-linear length $L_{NL}$. Under these conditions the system may be designed so the optical pulses experience minimum non-linear impairment, and short pulse/high peak power levels are reproduced at the output of the delivery fiber.

15 Claims, 5 Drawing Sheets

OPTICAL FIBER SYSTEMS FOR DELIVERING SHORT HIGH POWER PULSES

RELATED APPLICATION

This application is a continuation of application Ser. No. 11/105,850, filed Apr. 4, 2005.

FIELD OF THE INVENTION

This invention relates to optical fiber systems that produce very short, high power, optical pulses.

BACKGROUND OF THE INVENTION (Parts of the following section may not be prior art.)

Optical fiber lasers are available that produce optical pulses with high pulse energy, good beam quality and excellent optical characteristics. Several applications for these optical pulse lasers exist, ranging from time-resolved near-field scanning optical microscopy (NSOM) pump-probe experiments for understanding ultrafast electronic processes in materials (see S. Smith, N. C. R. Holme, B. Orr, R. Kopelman and T. B. Norris, "Ultrafast measurement in GaAs thin films using NSOM," *Ultramicroscopy*, vol. 71, pp. 213-223, 1998); for two-photon fluorescence of dyes (see A. Lago, A. T. Obeidat, A. E. Kaplan, J. B. Khurgin, P. L. Shkilnikov and M. D. Stern, "Two-photon-induced fluorescence of biological markers based on optical fiber," *Optics Letters*, vol. 20, pp. 2054-2056, 1995); for studying biological processed in living tissues (see G. Alexandrakis, E. B. Brown, R. T. Tong, T. D. McKee, R. B. Campbell, Y. Boucher, and R. K. Jain, "Two-photon fluorescence correlation microscopy reveals the two-photon natures of transport in tumors," *Nature Medicine*, vol. 10, pp. 203-207, 2004). The last application has potential impact on the prospects for non-invasive cancer detection schemes where the delivery fiber is an endoscope (see E. B. Brown, Y. Boucher, S. Nasser, R. K. Jain, "Measurement of macromolecular diffusion coefficients in human tumors," *Microvascular Research*, vol. 67, pp. 231-236, 2004).

For the case of studying live tissues, the fs pulse acts as the pump beam that excites fluorescence mediated by a 2-photon process. Since multi-photo processes are by nature inefficient, high peak powers are needed. However, this cannot be achieved by increasing the average power of the source, because high average power will cause tissue damage. Hence, such applications typically require pulses of the duration of roughly 100 fs, with pulse energies as high as 1 nJ, while the average power is maintained at roughly 100 mW or lower. A commonly used laser source for such schemes is a mode-locked Ti:Sapphire laser that can output very high peak powers with repitition rates of ~80 MHz.

The delivery fiber desirably propagates the high power, short pulses through a (typically) 1-2 meter-long fiber, and provides an output that is close in characteristics to the laser output. However, there are two physical constraints that affect the output from the delivery fiber. The dispersion of the fiber, due to material as well as waveguide dispersion, leads to pulse broadening that transforms the 100-fs pulse at the input of the fiber into 10-20 ps long pulse at the fiber-output. In addition, since the peak power levels are so high, nonlinear phase shifts due self-phase modulation (SPM) lead to a narrowing of the spectral width of the pulse, further broadening the pulse. The dispersion effect is linear, and thus may be compensated by a bulk linear chirp element between the Ti:Sapphire output and fiber input. The linear chirp element may be a bulk grating or prism pair used to stretch or compress pulses. Such elements are capable of providing arbitrary amounts of positive or negative dispersion. For this application, they may be adjusted to provide dispersion that is equal in magnitude, but opposite in sign to that of the specified length of the fiber endoscope/delivery medium.

Accordingly, while the dispersion problem may be addressed with some effectiveness, the nonlinear SPM effect is non-recoverable. Hence, a majority of fiber delivery schemes work with special fibers or complicated phase engineering of pulses to counteract the SPM effect.

In a high performance system the delivery fiber should also be a single mode fiber with low loss. Propagation in multiple modes degrades the ability to tightly focus the output from the fiber. A tightly focused output enables concentrating the high peak power pulse on a small region, thus enabling efficient 2-photon fluorescence, as well as ensuring high resolution for microscopy applications. Propagation in multiple modes also spreads the pulses due to modal dispersion, which lowers the peak power and reduces the efficiency of nonlinear measurement techniques.

Low bend losses are desirable in applications, such as endoscopes, where the fiber, even though short in overall length, may still undergo multiple bends. Connection losses include the concatenation of a collimating element at the fiber output. This element will focus the output to a tight spot. Candidates for the collimating element are fiber-GRIN lenses, or thin-film-based diffractive optic elements such as mode transformers, or other beam shaping elements. Normally, such miniature beam shaping elements can be epoxy-bonded to the tip of the fiber, but considering that very high peak powers will emanate from the fiber, it is desirable that a mode transforming element such a long-period grating or GRIN lens be used, since they are fiber-based, and can be easily fusion spliced to the output of the fiber, with low loss and high power handling capability.

The baseline candidate for the delivery fiber is a standard fiber (doped core, and silica cladding) which is single-moded at the desired wavelength of operation. A typical desired operating wavelength is ~800 nm (for Ti:Sapphire lasers), and the effective area ($A_{eff}$) of a standard single mode fiber (SMF) at this wavelength is <25 $\mu m^2$. This fiber satisfies all the above criteria, but at pulse energies >0.1 nJ, SPM severely distorts the pulse. The pulse width rapidly expands past 250 fs (desired pulse widths are <200 fs).

A variety of solutions to the SPM problem have been proposed. Among these are using a multimoded fiber, but forcing signal propagation in the fundamental mode to enable signal propagation in a large $A_{eff}$, thus decreasing SPM. See F. Helmchen, D. W. Tank and W. Denk, "Enhanced two-photon excitation through optical fiber by single-mode propagation in a large core," *Applied Optics*, vol. 41, pp. 2930-2934, 2002. However, pulse widths obtained with this method are still undesirably large, especially for two-photon applications.

A variation of the above solution is to use a large core, multimoded microstructure fiber. See D. Ouzounov, K. Moll, M. Foster, W. Zipfel, W. W. Webb and A. L. Gaeta, "Delivery of nanojoule femtosecond pulses through large-core microstructured fibers," *Optics Letters*, vol. 27, pp. 1513-1515, 2002. Microstructured fibers are guided by a photonic crystal of air holes running through the glass fiber, and this mitigates mode coupling problems. However, it appears that coupling effectively only into the fundamental mode in microstructured fibers is a problem, and significant power is lost to higher order modes. This causes unwanted modal noise in the system. In addition, microstructured fibers have poor geometric control compared to standard doped fibers, and a potential drawback is geometric ovalities that would cause large polarization mode dispersion (PMD), a source of additional noise.

Another option is the use of photonic bandgap fibers, where the signal propagates in a central air core. In this case, most of the signal energy resides in air, and hence undergoes negligible amounts of SPM-based pulse broadening. However, photonic bandgap fibers are difficult to manufacture in comparison to doped fibers, and hence are not a cost-effective solution. Geometric regularity problems are severely exacerbated, leading to the possibility of high PMD and associated problems. They also suffer from the inability to splice a mode-shaping element at the fiber output, because the splice causes the photonic bandgap effect to disappear, and will yield large losses.

Another proposal is to use pulse shaping schemes to combat the nonlinear broadening in standard fibers. The pulse is temporally chirped, and spectrally narrowed before launching into the delivery fiber. While this produces short pulses, the power levels are low and not desirable for two-photon applications.

New approaches that can minimize the deleterious effects of nonlinear SPM, while maintaining the advantages of a standard fiber, such as low propagation and bend losses, low PMD, ability to splice to GRINs and other lenses, and high manufacturing yield and control, would represent a significant advance in the technology.

BRIEF STATEMENT OF THE INVENTION

We have developed an optical fiber system for delivering ultrashort pulses with minimal distortions due to nonlinearity. The system is based on delivering the optical pulses in a higher order mode (HOM) of a few-moded fiber. The fiber is designed so that the dispersion for the HOM is very large. This results in a dispersion length $L_D$ for the delivery fiber that is exceptionally small, preferably less than the non-linear length $L_{NL}$. Under these conditions the optical pulses experience minimum non-linear impairment, and short pulse/high peak power levels are reproduced at the output of the delivery fiber.

DETAILED DESCRIPTION

Figure 1:
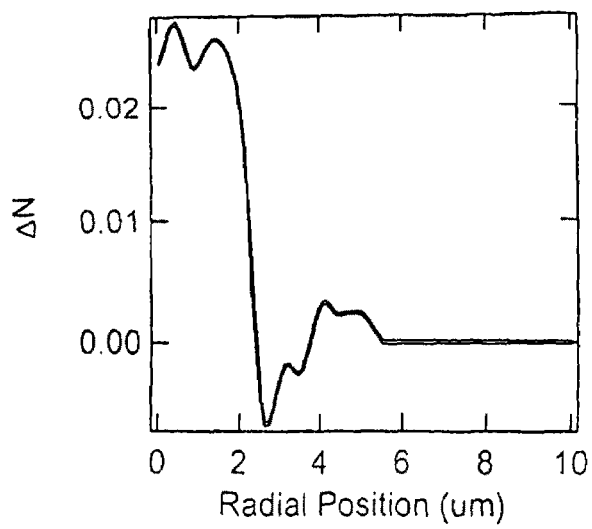
FIG. 1 is a refractive index plot for a specially designed few mode/HOM fiber optical fiber.

The relative magnitudes of dispersive and nonlinear effects in fibers used for short pulse propagation are succinctly described by two characteristic lengths, the dispersion length $L_D$, and the nonlinear length $L_{NL}$, given by:

$$L_D = \left(\frac{\tau^2}{D}\right) \cdot \left(-\frac{2\pi c}{\lambda^2}\right) \quad (1)$$

$$L_{NL} = \frac{cA_{eff}}{n_2 \omega P_{peak}}$$

where $\tau$ is the undistorted pulse width, D is the dispersion of the fiber waveguide, c is the speed of light, $\omega$ is the central frequency of the pulse, $n_2$ is the nonlinear response of the fiber material, $P_{peak}$ is the peak power of the pulse in the fiber, $A_{eff}$ is its effective area, and $\lambda$ is the central wavelength of the pulse. These characteristic lengths describe the maximum distance a pulse can travel before it becomes significantly distorted by the corresponding impairment. Since dispersion can be easily compensated but SPM cannot, it is desirable to design a fiber such that $L_D$ is as small as possible in comparison to $L_{NL}$. In this case, a highly chirped pulse can be launched into a fiber so that it is compressed as it propagates through the fiber and reaches its shortest duration and highest peak power (and hence becomes subject to significant SPM) only near the output end of the fiber. In other words, for the condition:

$$L_D \ll L_{NL} \quad (2)$$

the pulse will not travel a large enough distance with high peak power to experience significant nonlinear pulse distortion, hence facilitating high energy pulse transmission.

In standard SMFs an 800-nm, 100-fs pulse with 1 nJ energy, typical values for the characteristic lengths are $L_D \sim 9$ cm and $L_{NL} \sim 1.3$ cm (the corresponding dispersion of SMF is $-100$ ps/nm-km). Thus $L_D \gg L_{NL}$, and nonlinear effects dominate, yielding undistorted pulses only for energies as low 0.1 nJ (that is, only for pulse energies as low as 0.1 nJ, the $L_D/L_{NL}$ ratio is substantially smaller than unity). Existing fiber designs to combat this problem, as mentioned earlier, concentrate on satisfying condition (2) by increasing the $A_{eff}$ for signal propagation. This serves to make $L_{NL}$ significantly larger than $L_D$ (which is held nominally constant and similar to SMF).

The novel class of fiber designs proposed here yield an innovative means to satisfy condition (2). Instead of increasing $A_{eff}$ (and thus $L_{NL}$), the signal is propagated in a higher order mode (HOM) of a fiber specially designed to yield very high negative dispersions for one particular HOM. Hence, condition (2) is satisfied by holding $L_{NL}$ nominally constant and similar to that of SMF, but $L_D$ is significantly shortened by increasing the magnitude of (negative) dispersion provided by the HOM of the fiber.

HOMs of specially designed few moded fibers are especially suited for this application, because HOMs can offer very high dispersion values, while maintaining a large $A_{eff}$, and very low propagation and bend losses. It has been demonstrated that the $LP_{11}$ mode of a fiber can have dispersions as high as $-700$ ps/nm-km at the operation wavelength of 1550 nm. It has also been shown that the $LP_{02}$ mode at the operation wavelength of 1550 nm can have $-210$ ps/nm-km dispersion, and only 0.45 dB/km loss, yielding very high figures of merit (FOM=dispersion/loss) of 466 ps/nm-dB. This enables up to 50% longer transmission distances for communication pulses, because the large dispersion and $A_{eff}$ of these fibers mitigate nonlinear distortions in comparison to a communications system that uses single mode dispersion compensating fibers.

Optical fibers suitable for use in the invention have low ratios of $L_D/L_{NL}$, which enables high power pulse propagation for fs laser pulse delivery systems, as described earlier. In the preferred embodiments, this ratio is less than 1, and preferably less than 0.5. The specific optical fibers described here utilize the $LP_{02}$ of the fiber for pulse propagation, but similar designs can be achieved for any HOM. While such designs can be applied for any wavelength of operation, illustrative designs described below are optimized for fiber-delivery of Ti:Sapphire laser pulses, which nominally operate in the 800-nm wavelength range. That suggests that the wavelength range over which the devices of the invention preferably operate is 700-900. However, other wavelength regimes may also be found useful. As a reference, the specific optical fiber designs used to illustrate the invention can be compared to SMF, which has a $L_D/L_{NL}$ ratio of ~6.92, which yields undistorted pulses for pulse-energies up to 0.1 nJ (maximum undistorted pulse energy achievable with a fiber is roughly proportional to the $L_D/L_{NL}$ ratio—value of $L_{NL}$ depends on pulse energy as well as undistorted width—this has been calculated for 1-nJ pulses of 100 fs width, in all cases illustrated here). The objective, in some preferred embodiments, is to achieve $L_D/L_{NL}$ ratios smaller than unity. Few mode fibers supporting these specially designed HOMs can be distinguished from standard multimode fibers in two respects. Firstly, they are intentionally designed to be highly dispersive for one particular, desired HOM, in contrast with multimode fibers, where most of the modes experience negligible waveguide dispersion, and the dispersion of all modes is similar to the material dispersion of silica glass. Secondly, the fibers are designed such that the propagation constant of the desired HOM of propagation is sufficiently separated from other modes, so as to avoid intermodal coupling at bends.

Figure 2:
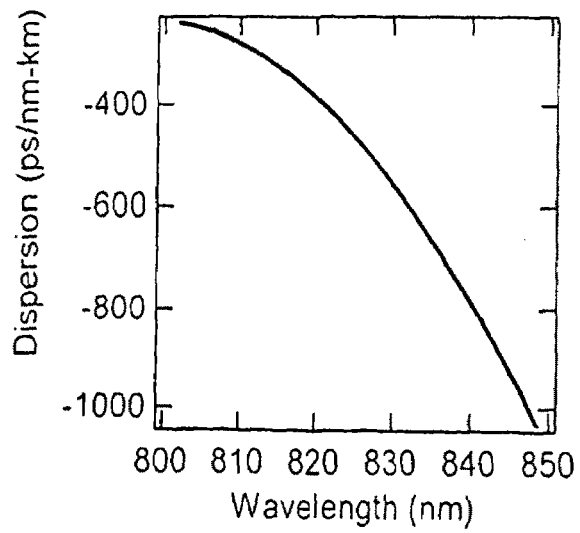
FIG. 2 is a plot showing dispersion for LP2 mode propagation in the optical fiber of FIG. 1.
Figure 3:
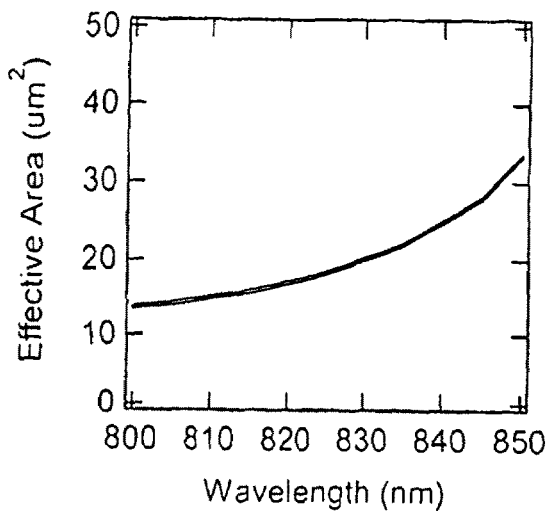
FIG. 3 is a plot of effective area ($A_{eff}$) for the optical fiber of FIG. 1.

FIG. 1 shows an experimentally measured refractive index profile of a fiber fabricated to yield low $L_D/L_{NL}$ ratios for 100-fs, 1-nJ pulses traveling in the $LP_{02}$ mode. FIG. 2 shows the measured dispersion for this fiber. FIG. 3 shows the $A_{eff}$ for the $LP_{02}$ mode. As is clear from FIGS. 2 and 3, the $LP_{02}$ mode of this fiber has approximately 8 times larger negative dispersion compared to SMF (corresponding to reduction of dispersion length, $L_D$ by a factor of 8). At the same time, the $A_{eff}$ is approximately 25 $\mu m^2$ at 840 nm, which is similar to that of SMF (the $A_{eff}$ of SMF being on the order of 20 $\mu m^2$). Maintaining $A_{eff}$ similar to SMF has significant advantages over conventional large $A_{eff}$ designs because mode coupling and bend losses increase quadratically with $A_{eff}$. A delivery fiber with high bend losses or mode coupling would in most cases be unsuitable, for example, in endoscope applications where the fiber is expected to substantially bend during operation. To reduce losses in a delivery fiber operating at approximately 800 nm, $A_{eff}$ may be held to less than 50 microns$^2$.

Given the properties of the novel HOM fiber illustrated in FIG. 1, one can estimate that the $L_D/L_{NL}$ ratio ~0.69 for 100 fs, 1 nJ pulses, leading to an order of magnitude increase in extractable undistorted pulse energies in comparison to SMF. Thus, these fibers can support short (100 fs) pulse delivery of energies up to 1 nJ.

Figure 4:
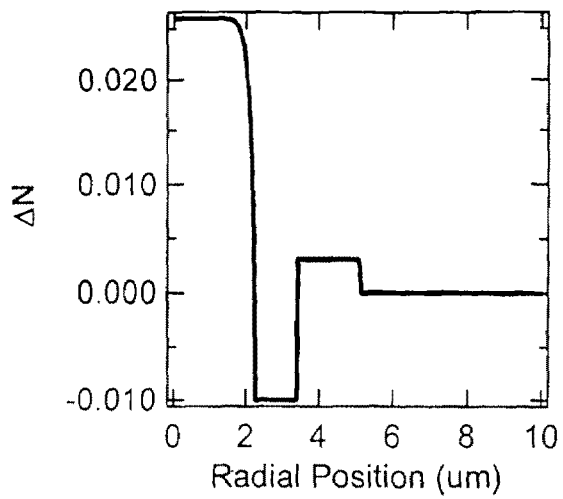
FIG. 4 is a refractive index plot for another few mode/HOM fiber optical fiber.
Figure 5:
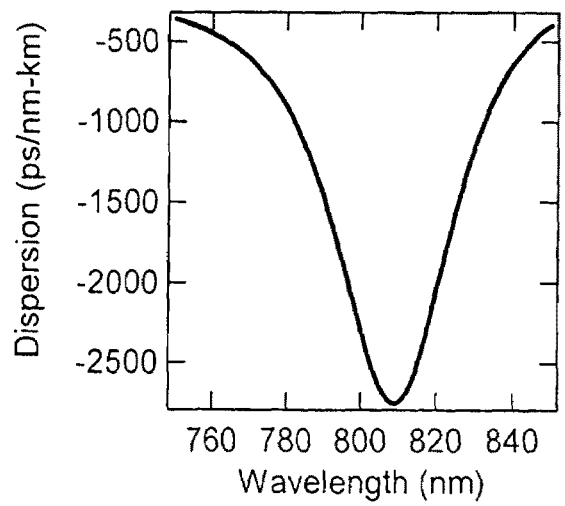
FIG. 5 is a plot showing LP2 dispersion for the optical fiber of FIG. 4.
Figure 6:
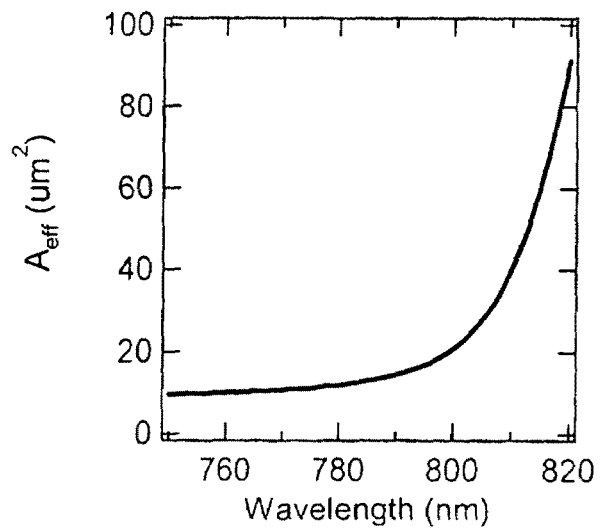
FIG. 6 is a plot of $A_{eff}$ for the optical fiber of FIG. 4.

The flexibility of this design space is further illustrated with the theoretically designed fiber whose refractive index profile is illustrated in FIG. 4. FIGS. 5 and 6 show the dispersion and $A_{eff}$ for the $LP_{02}$ mode at 800 nm for this fiber, respectively. As can be seen, dispersion values as high as −2300 ps/nm-km are easily achievable, with a similar $A_{eff}$ effective area $A_{eff}$ (on the order of 21 $\mu m^2$). The resultant $L_D/L_{NL}$ ratio for this fiber is 0.29 (a factor of 24 smaller than SMF), yielding undistorted 100 fs pulses with energies as high as 2.4 nJ. This value comfortably surpasses the typical pulse energies required for several applications such as 2-photon fluorescence imaging for in-vivo cancer detection in live tissues.

Figure 7:
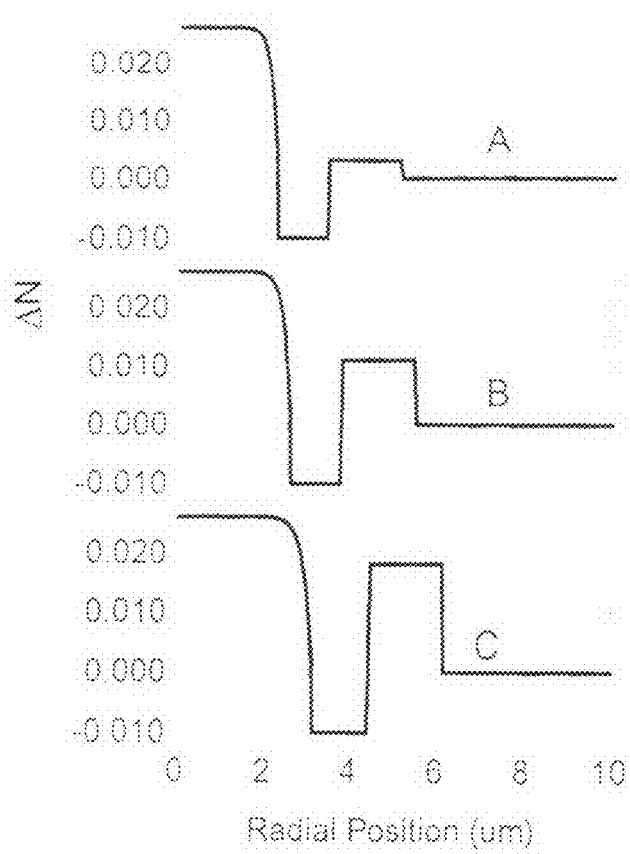
FIG. 7 is a refractive index plot for three different optical fibers A, B, and C, suitable for use in the invention.
Figure 8:
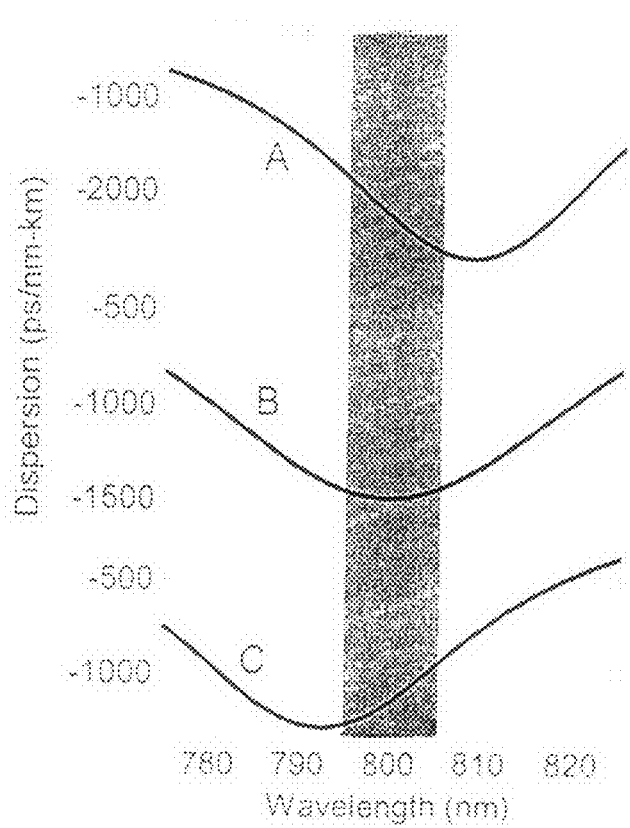
FIG. 8 is a plot showing dispersion for the HOM LP2 in the optical fibers A, B, and C of FIG. 7.

HOMs also provide a greater degree of design-freedom to achieve desired dispersion profiles, in addition to the large dispersion magnitudes. Note that the dispersion profiles in FIGS. 2 and 5 have high, negative-dispersion-slopes, in addition to high magnitudes of dispersion. All fibers, including the large $A_{eff}$ microstructured fibers, and conventional SMF previously used for this application, have similar high dispersion slope values. This causes problems because most commonly available, bulk-optic-based pulse chirping elements used before the light enters the fiber, impart negligible dispersion slope to the pulse. As a result, even in the absence of SPM nonlinearities, the recompressed pulse at the fiber-output is often broadened compared to the original laser pulse, due to uncompensated dispersion arising from the dispersion-slope mismatch between the bulk optic pulse stretcher and that of the fiber. Dispersion engineering flexibility with HOMs enables achieving any desired dispersion slope. FIG. 7 shows three different refractive index profiles, for fibers A, B, and C, each yielding high negative dispersion for the $LP_{02}$ mode. The dispersion curves for these three fibers are shown in FIG. 8. In the 795 nm to 805 nm wavelength range (the shaded region illustrates the bandwidth of operation), the profile for fiber A yields a negative dispersion slope, as do standard SMF or large area microstructured fibers, but profiles for fibers B and C yield zero and positive dispersion slope values, respectively. This enables efficient dispersion matching with any kind of bulk-optic pulse stretcher design.

Figure 9:
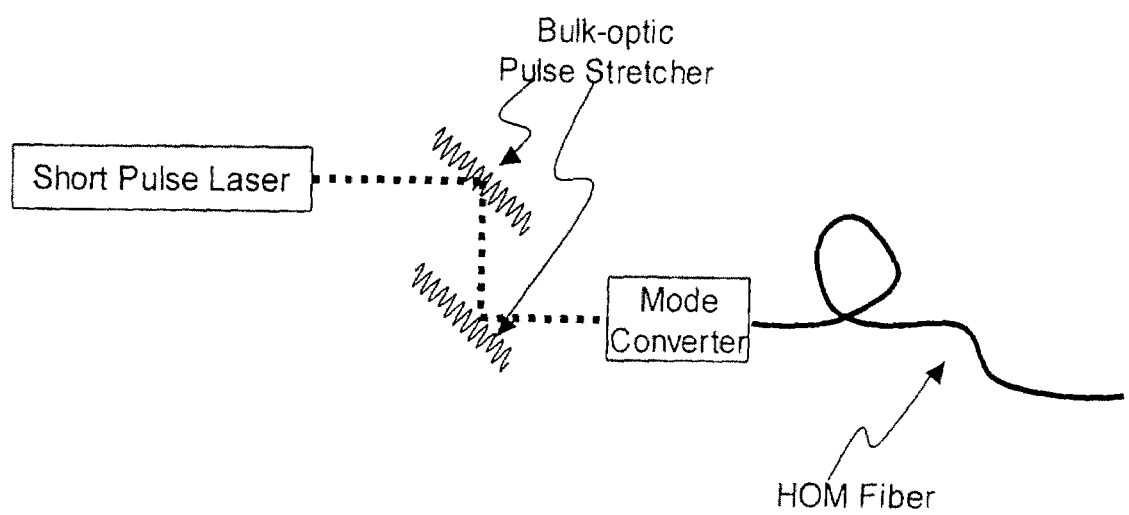
FIG. 9 is a schematic presentation of a short pulse delivery system according to one embodiment of the invention.

The inventive fiber designs illustrated here can be utilized in a high power pulse delivery system. FIG. 9 shows an exemplary device schematic. The fiber device is preceded by an assembly comprising the short pulse laser followed by a bulk-optic pulse stretcher (the pulse stretcher is illustrated as a pair of bulk gratings, but the equivalent function can also be achieved with a pair of prisms or a specialized dispersive element such as a photonic bandgap fiber). Then, the signal enters the HOM fiber via a mode converter, which converts the incoming beam with a nominally Gaussian spatial profile, to match that of the HOM in the fiber. Bulk diffractive-optic elements can be used to achieve broadband mode conversion with more than 99% conversion efficiency. A preferred schematic uses in-fiber long-period gratings that operate at the so called turn-around-point (TAP), as disclosed in U.S. Pat. No. 6,768,835. That patent is incorporated herein by reference for more details on TAPs in optical fibers. It describes mode converters that can be induced in fibers similar to the dispersive HOM fiber disclosed here. These mode converters can be fabricated to achieve up to 99.997% mode conversion efficiency, with losses less than 0.2 dB.

Figure 10:
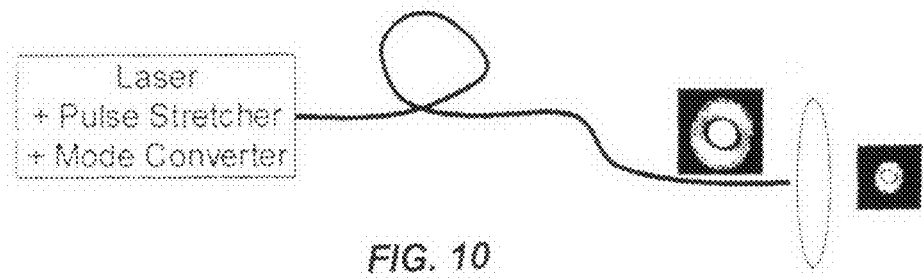
FIG. 10-13 are schematic presentations of the system of FIG. 9 showing optional collimating elements.
Figure 11:
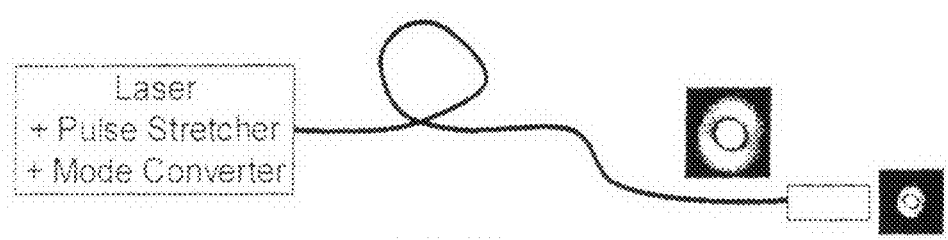
Figure 12:
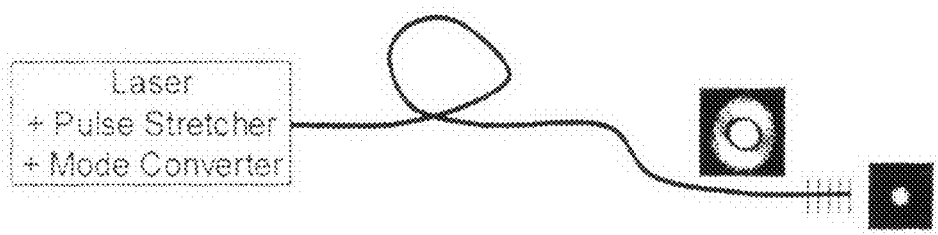
Figure 13:
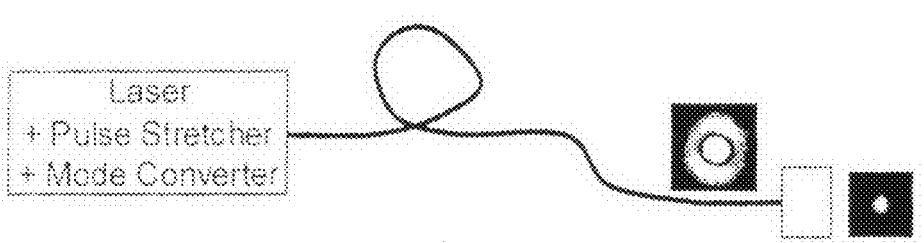

For most applications, the high power pulse at the output of the fiber is focused on to a small spot size to obtain large 2-photon fluorescence. As mentioned earlier, the HOM fiber should not be confused with a multimode fiber. The signal exits the fiber in a single well-defined mode. Hence it can be focused with lenses in a manner identical to conventional Gaussian beams, to achieve any desired spot size. FIGS. 10-13 illustrate this, and show the modal image of the $LP_{02}$ mode in the HOM fiber, as well as a similar, but spatially contracted mode pattern after a collimating device following the fiber. FIG. 10 shows the use of a standard bulk-optic lens, while FIG. 11 shows the use of a fiber-based GRIN lens. Alternatively, with reference to FIG. 12, if a Gaussian output is desired a TAP grating similar to those described earlier may be used. In FIG. 13, the collimating element represents generically any one of a variety of beam shaping elements that can convert a complex spatial pattern into a Gaussian pattern.

While the mode converters described in connection with FIG. 9 for converting the incoming, and optionally the outgoing, signals between modes are long period gratings, the mode converters may be of any suitable design. The mode converting functionality may be achieved within the delivery fiber using in-fiber grating mode converters. Alternatively, holographic free-space mode converters, or tapered hollow-core fibers, may be employed.

While different types of mode converters may be used for the invention, as indicated above, a preferred means to obtain the mode-converting device functionality is with a broadband long period fiber grating (LPG). The LPG may be induced in the HOM fiber itself, enabling a low cost, low loss, mode-converting device. Broadband mode converters are known that cover a wavelength range as large as 500 nm. For more details see S. Ramachandran, M. Yan, E. Monberg, F. Dimarcello, P. Wisk and S. Ghalmi, "Record bandwidth microbend gratings for spectrally flat variable optical attenuators," *IEEE Photon. Tech. Lett.*, vol. 15, pp. 1561-1563, 2003; S. Ramachandran, U.S. Pat. No. 6,768,835, both of which are incorporated by reference herein.

Whereas it is shown or may be inferred that the output from the short pulse device of the invention is propagated in free space, using standard collimating devices, it may also be coupled to other forms of media.

Methods for making optical fibers with profiles like those in FIG. 7 are well known and well developed. The core region generally consists of silica doped with germanium at concentrations less than 10 wt % at the position of maximum index, and graded with radius to provide the shape desired. The center core is typically has a radius of less than 20 microns. The inner cladding region may be undoped, or lightly doped.

Optical fibers as described above that are specially designed to support HOMs may be construed as meaning that a substantial portion, typically a predominant portion, of the optical energy propagating in the optical fiber is in a mode higher than the fundamental mode $LP_{01}$. Preferred HOMs are LP02 through LP0, 10; and LP11 through LP1, 10.

The element used to chirp the pulses, in the systems described here, is referred to as a pulse stretcher, which is a term familiar to those skilled in the art. For a another description of these elements see
http://www-phys.llnl.gov/Orqanization/VDivision/Research/USP/USPFacilityVirtualTour/cpa.h tml
incorporated herein by reference. The preferred choice of pulse stretchers are those operating on bulk optics, i.e. the optical pulses propagate through the stretching element. High-quality gratings and prisms are in this category.

The operation of the devices described above relies in part on having relatively high dispersion in the HOM fiber. While the actual dispersion value will vary, the typical dispersion value will be less than (more negative than) –150 ps/nm-km. The length of the delivery fiber will in part be determined by the dispersion value. In a qualitative sense, that length is where the dispersion in the HOM fiber compensates for the nominal dispersion from the pulse stretcher that appears at the input of the HOM fiber, but before the optical pulses undergo significant non-linear distortion. That length is typically from 1-20 meters. It should be evident that this relatively short length distinguishes in the usual sense this fiber from a transmission fiber.

While in principle the devices described here may function over a wide band of pulse frequencies and pulse length, the invention is preferably directed to devices where the pulses are femtosecond pulses (i.e. less than 1 picosecond), or shorter. In preferred embodiments the pulses are less than 200 femtoseconds.

Various other modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. A method for generating short high power optical pulses, said method comprising:
   (a) generating optical laser pulses,
   (b) propagating the optical laser pulses through a pulse stretcher;
   (c) converting the propagating mode of the optical laser pulses to one particular higher order mode,
   (d) propagating the optical laser pulses in the one particular higher order mode along a length L of higher order mode optical fiber to an output, wherein the higher order mode optical fiber exhibits a characteristic dispersion length $L_D$, a characteristic nonlinear length $L_{NL}$, a negative dispersion D and an effective area $A_{\textit{eff}}$ at the one particular higher order mode such that $L_D$ is less than $L_{NL}$ so that short high power optical laser pulses are generated at the one particular higher order mode.

2. The method of claim 1 wherein L is less than 20 meters.

3. The method of claim 2 wherein the durations of the optical laser pulses are less than 200 femtoseconds.

4. An optical laser device for generating short high power optical pulses comprising:
   (a) a source of optical laser pulses;
   (b) a pulse stretcher coupled to the source of optical laser pulses,
   (c) a mode converter coupled to the pulse stretcher to convert the propagating mode of the optical laser pulses to a one particular higher order mode,
   (d) an optical fiber coupled to the mode converter, the optical fiber supporting the one particular higher order mode,
   wherein the optical fiber has a characteristic dispersion length $L_D$, a characteristic nonlinear length $L_{NL}$, a negative dispersion D and an effective area $A_{\textit{eff}}$ at the one particular higher order mode such that $L_D$ is less than $L_{NL}$ so that short high power optical laser pulses are generated at the one particular higher order mode
   wherein the length L of the optical fiber is such that the dispersion in the fiber compensates for the nominal dispersion from the pulse stretcher.

5. The optical device of claim 4 wherein the optical laser pulses have a wavelength in the range of 700-900 nm.

6. The optical device of claim 5 wherein the optical fiber has a dispersion value of less than –150 ps/nm-km.

7. The optical device of claim 4 wherein $L_D$ is less than 0.5 $L_{NL}$.

8. The optical device of claim 7 wherein durations of the optical laser pulses are less than 200 femtoseconds.

9. The optical device of claim 8 wherein the source of optical laser pulses is a titanium/sapphire laser.

10. The optical device of claim 4 wherein the mode converter comprises a long period grating.

11. The optical device of claim 10 wherein the long period grating has a turn around point.

12. The optical device of claim 4 wherein the pulse stretcher comprises a bulk-optics element.

13. The optical device of claim 4 wherein the optical fiber terminates with a collimating element.

14. The optical device of claim 4 wherein the optical fiber has a length of less than 20 meters.

15. The optical device of claim 4 wherein the optical fiber supports the $LP_{02}$ mode.

\* \* \* \* \*